Aug. 9, 1960   R. D. WRIGHT   2,948,555
CONTROLLED GAP SEAL
Filed Aug. 8, 1955   2 Sheets-Sheet 2
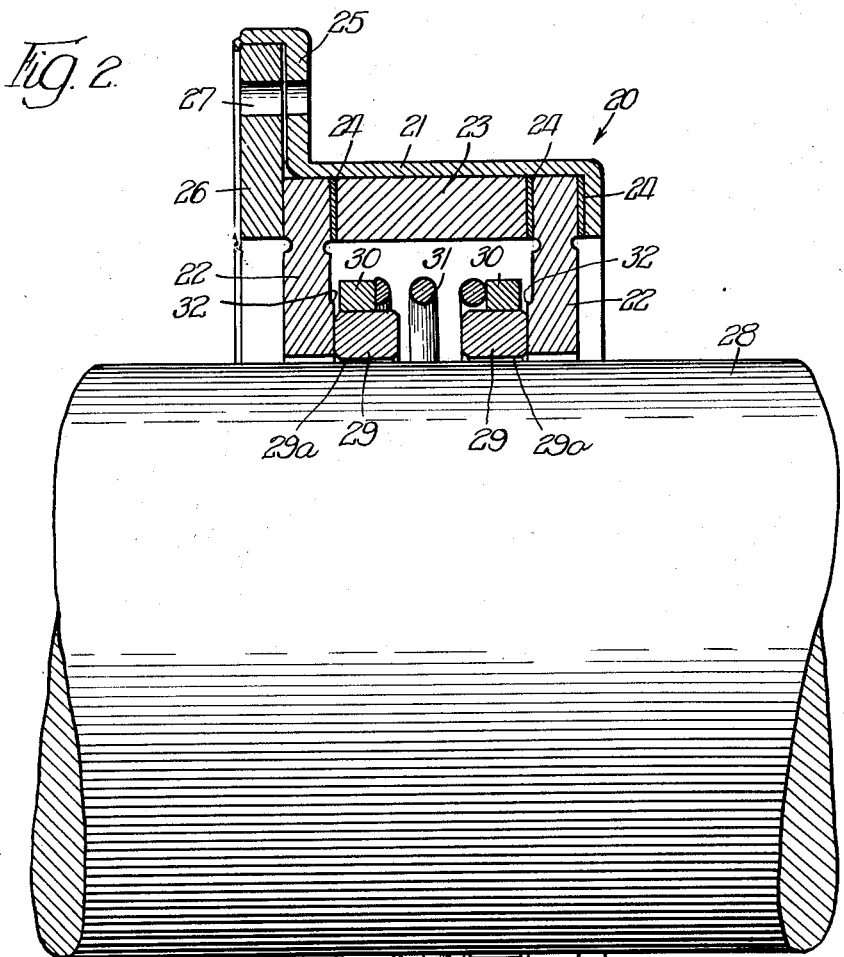
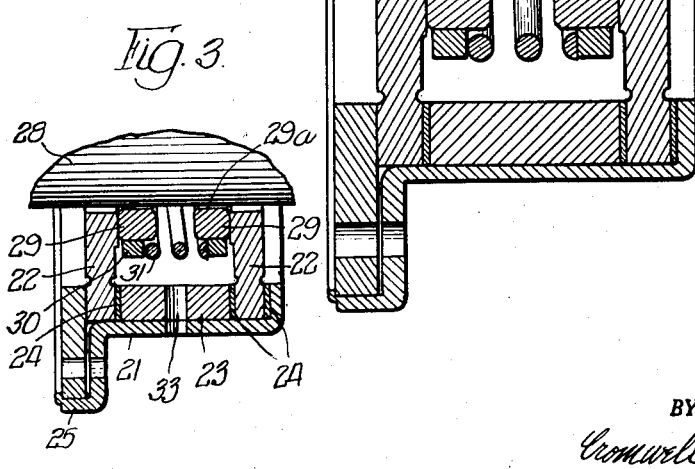
INVENTOR.
Robert D. Wright,
BY
Cromwell, Greist & Warden
Attys.

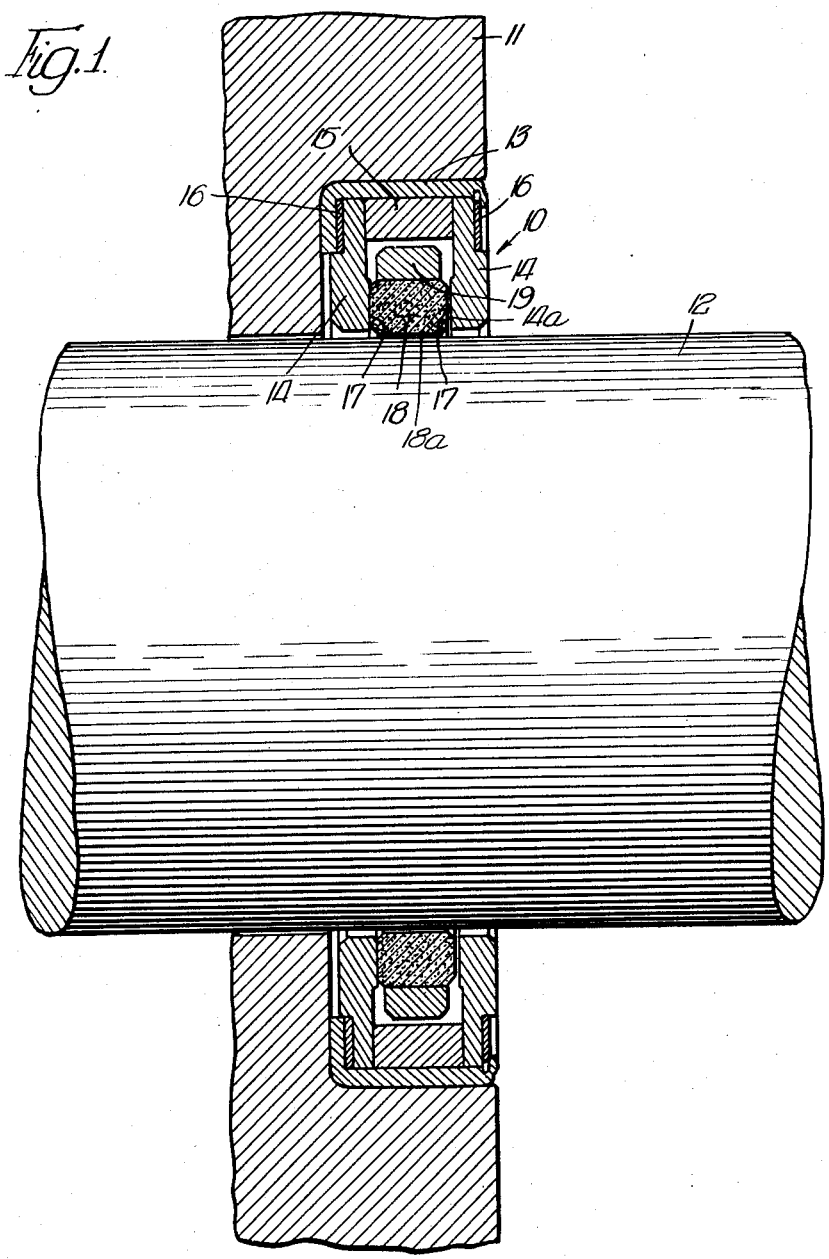

United States Patent Office 2,948,555
Patented Aug. 9, 1960

2,948,555

CONTROLLED GAP SEAL

Robert D. Wright, Des Peres, Mo., assignor to Chicago Rawhide Manufacturing Company, Chicago, Ill., a corporation of Illinois Filed Aug. 8, 1955, Ser. No. 527,026

4 Claims. (Cl. 286—11.13)

The present invention relates generally to a seal having a sealing member formed from high temperature, friction resistant material of a susbtantially non-flexible nature capable of improved sealing operation under varying conditions. More specifically, the present invention is directed to a gap seal capable of maintaining a controlled rate of orbital flow along a surface being sealed even though substantial changes in operating conditions occur.

The high temperature, high speed operation of various devices, such as jet engines, requires the use of seals formed from a material capable of withstanding the extreme conditions. An example of such a material is carbon which is capable of withstanding high temperatures as well as considerable frictional wear. Carbon however is substantially non-flexible and furthermore exhibits a fairly low rate of thermal expansion in response to changing temperature conditions. As a result, sealing rings of circumferentially continuous form made from carbon for use on a high speed steel shaft under relatively high temperature conditions expand at a slower rate than the rate of expansion of the steel shaft in response to increasing temperatures and ultimately become frozen to the shaft.

Efforts have been made to overcome the foregoing disadvantages accompanying the use of a circumferentially continuous carbon ring under changing temperature conditions. These efforts have included the forming of a carbon sealing ring from a plurality of arcuate sections of carbon which are spring urged into sealing engagement with the shaft. In the operation of such a seal the springs supply to the carbon ring a degree of flexibility which the carbon alone does not inherently possess and, as a result, the segmental ring does not become frozen to the shaft under changing temperature conditions. However the sealing efficiency of this type of ring is poor due to the creating of gaps between each of the segments of the ring upon the expansion of the shaft as a result of increasing temperatures. To maintain the efficiency of a seal of this nature it has been found necessary to utilize a complicated and expensive series of segmental rings located with respect to one another in fixed relation to provide a tortuous path for the oil or other fluid being sealed to reduce the extent of leakage occurring through the seal.

It is an object of the present invention to provide a circumferentially continuous sealing unit including a circumferentially continuous carbon sealing ring which while due to the inherent properties of the carbon ring requires the maintenance of a gap between the inner surface of the ring and the surface to be sealed, nevertheless is capable of maintaining the gap substantially constant even though the sealing unit and the surface to be sealed is subjected to substantial changes in operating conditions, particularly increased temperatures.

A further object is to provide a controlled gap sealing unit which includes a sealing element formed from material having a rate of thermal expansion different from that of the material making up the surface to be sealed, the sealing element being provided with a compression member formed from material having a rate of thermal expansion substantially equal to that of the material forming the surface to be sealed, which compression member is capable of controlling the rate of expansion or contraction of the sealing element under changing temperature conditions even of an extreme nature to substantially maintain constant the radial clearance existing between the sealing element and the surface to be sealed.

Other objects not specifically set forth will become apparent from the following detailed description of the invention taken in conjunction with the drawings wherein:

Fig. 1 is a sectional view of one form of the seal of the present invention illustrating the use of a single ring applied in a typical installation to a rotary shaft;

Fig. 2 is a sectional view of a modified form of seal incorporating the use of a pair of rings; and Fig. 3 is a fragmentary sectional view in reduced scale of a modified form of the seal of Fig. 2.

In Fig. 1 the reference numeral 10 generally designates a seal which incorporates the principles of the present invention. The seal 10 is suitably positioned within a housing 11 which is shown in fragmentary cross section and which further is adapted to house a shaft 12. The seal 10 comprises a casing 13 which includes fixedly clamped vertical end walls 14 held in spaced relation by means of spacer 15. Gaskets 16 are suitably inserted within the casing 13 to seal the same in the known manner. Each of the end walls 14 is provided with inwardly projecting surfaces 17 which are machined or lapped for sealing engagement with the side walls of a carbon sealing ring 18 positioned intermediate the end walls 14.

The carbon ring 18 is of generally rectangular cross section and, after being placed under radial compression in the manner and by the means hereinafter explained, has an inside diameter or bore which is slightly greater than the outside diameter of the shaft 12. As a result of this difference in dimensions a small but important clearance 18a exists in the form of a gap between the inner annular surface of the ring 18 and the outer periphery of the shaft 12. The ring 18, as shown, is circumferentially continuous and is disposed within the casing 13 in slightly spaced but concentric relation to the shaft 12. The width of the ring 18 is somewhat less than the distance between the opposed lapped surfaces 17 of the end walls 14. With this arrangement the ring 18 is free to rotate relative to the shaft 12 and is also free to rotate with respect to the casing 13.

One of the principal features of the present invention resides in the manner in which the radial clearance or gap 18a between the inner surface of the ring 18 and the outer surface of the shaft 12 is controlled and maintained constant within limits under changing temperature conditions.

The thermal coefficient of expansion of carbon is sufficiently different from that of steel that, upon the heating up of the shaft 12 and ring 18 during high speed operation, the ring 18 would have except for the precompression of the same, a tendency to expand at a lesser rate than the rate of expansion of the shaft 12, thereby decreasing the radial clearance. As a result the seal would be incapable of maintaining a substantially constant gap during the high temperature conditions sometimes encountered in operation and would have a tendency to freeze on the shaft. To overcome this, a second ring 19 of steel is positioned about the outer annular surface of the carbon ring 18.

The steel ring 19 is preferably, like the carbon ring 18, of generally rectangular cross section, and is of substantial mass and radial thickness. It is slightly smaller in inside diameter than the original outside diameter of the ring 18 and serves to hold the latter in a state of compression. The ring 19, being solid and circumferentially continuous, can be heated and then shrunk on the ring 18, in accordance with conventional practices, to both compress the ring 18 and thereafter maintain the ring 18 in the desired compressed condition. The ring 19 on the ring 18 is free from contact with the casing 13 and can rotate freely relative to both the shaft 12 and the casing 13 with the ring 18.

As a result of the compressive action of the steel ring 19 on carbon ring 18, the sealing unit formed by these combined elements exhibits a modified and composite thermal expansivity-elasticity characteristic due to the steel ring 19 modifying the rate of expansion of the carbon ring 18 to a rate which is intermediate of the thermal rates of expansion normally attributable to the respective materials of the rings. As the shaft 12 heats up and expands in operation, the steel ring 19 will heat up and expand to much the same extent. Expansion of the ring 19 permits the pre-compressed carbon of the ring 18 to expand in returning toward its uncompressed state with the result that the inside diameter of the carbon ring 18 will increase in size enough to maintain an operative clearance between the ring 18 and the shaft at even very high temperatures of the shaft. The carbon due to being in a compressed state expands in response to the thermal expansion of the steel ring 19 and as a result its measurable rate of expansion under these conditions is greater than its inherent thermal rate of expansion. By selectively choosing the materials forming the rings 18 and 19 and combining them in this manner, the rate of expansion of the ring 18, under varying temperature conditions, can be controlled to an extent that the gap or radial clearance 18a existing between the inner annular surface of the ring 18 and the outer periphery of the shaft 12 remains substantially constant during high speed operation of the shaft 12 accompanied by a substantial temperature rise.

A typical installation for which the seal described above is especially suitable involves an application of the seal to protect the rear compressor bearing of a jet engine from the loss of lubricant during high temperature and high velocity jet engine operation. The rotative speeds involved in various aspects of jet engine operation may range from around 3000 r.p.m. to around 75,000 r.p.m. The pressure differential may be in the neighborhood of as high as 150 pounds per square inch and the operating temperature may fall in a range up to 1000° F. These are obviously conditions of the most severely trying sort to protect against, but they must be met and overcome, and they can be successfully handled by the present seal.

In this type of environment the seal of Fig. 1, using a carbon ring 18 and a steel ring 19, is particularly effective. As previously described, the ring 19 is shrunk-fit onto the ring 18 which places the ring 18 under compression. During the operation of the shaft 12 at high speeds, the radial clearance maintained between the inner annular surface of the ring 18 and the outer periphery of the shaft 12 provides an orbital and axial flow of a fluid, such as air, along the shaft through the seal. This leakage of fluid is used to prevent a reverse flow of a lubricating liquid back into the air stream and the seal, as a result, operates efficiently.

The pressure differential existing about the seal as evidenced by the axial flow of fluid along the shaft 12 operates on ring 18 to move a side surface thereof into rotatable sealing engagement with one of the raised lapped surfaces 17 of an end wall 14. The fluid contacts one side surface of the ring 18 through the clearance 14a to bring this about. This arrangement prevents leakage of lubricating liquid from the other end of the installation through the seal.

In the operation of the seal 10 during high speed rotation of the shaft 12 the ring 18 with its associated ring 19 will normally locate itself in concentric relation with the shaft 12 by reason of these rings being freely rotatable with respect thereto. The sealing unit is free to float radially to the very limited extent of its small shaft clearance so that in some phases it may operate eccentrically of the shaft whereas in others it will center itself in relation to the shaft. However, sealing efficiency is substantially the same in either case and regardless of the speed of operation of the shaft, the lubricating liquid is effectively retained in the bearing housing of the engine. It will be appreciated that at high speeds the carbon ring 18 is subjected to very substantial centrifugal forces and that the steel ring 19 will effectively protect the ring 18 from disintegration by its confining action.

The radial clearance maintained between the inner annular surface of the ring 18 and the outer periphery of the shaft 12 may vary depending upon the particular installation and the operating conditions to be met. Generally, the clearance will range from 0.0005 inch to 0.003 inch and due to the coaction between the rings 18 and 19 a clearance within this range may be maintained substantially constant throughout a wide range of operating temperatures.

Referring to Fig. 2, a modified form of seal incorporating the principles of the present invention is set forth. This seal, being generally designated by the numeral 20, includes a casing 21 which comprises vertical end walls 22 positioned a predetermined distance apart by spacer 23. Suitable gaskets 24 are provided to properly seal the casing 21 in the known manner. The casing 21 contains a flanged portion 25 which holds a ring 26. The flange 25 and ring 26 have aligned bores 27 to receive bolts or other suitable fastening means for attaching the casing 21 to a shaft housing.

The casing 21 surrounds a shaft 28 which is adapted for rotation relative to the casing. Within the casing 21 and freely rotatable with respect thereto are a pair of sealing units each of which comprises a carbon sealing ring 29 and a steel compression ring 30. The rings 29 and 30 are structurally similar to the rings 18 and 19 described in connection with Fig. 1 and function in the same manner. A spring 31 surrounds the shaft 28 and is positioned within the casing 21. Each of the ends of the spring 31 abuts one of the side surfaces of the rings 30 in such a manner as to urge the rings 30 and their associated rings 29 toward the side walls 22. Similarly, as described in connection with Fig. 1, each of the end walls 22 are formed with inwardly protruding surfaces 32 which are machined to promote a suitable lapped fit between their faces and the outer surfaces of the rings 29.

The operation of the seal 20, shown in Fig. 2, is similar to that described in connection with the seal 10 of Fig. 1. A radial tolerance 29a provided between the inner annular surfaces of the rings 29 and the outer periphery of the shaft 28 allows controlled leakage of fluid along the outer periphery of the shaft 28 and axially therewith. The spring 31 urges the sealing units composed of the rings 29 and 30 in a direction away from one another toward the lapped surfaces 32 of the end walls 22. As a result the seal 20 will be effective against loss of lubricant in one axial direction and will also protect a lubricated member such as a shaft bearing from being unduly subjected to a high temperature high velocity gas flow in the reverse direction notwithstanding a controlled axial leakage of high temperature fluid.

Fig. 3 illustrates a slightly modified form of the seal 20 of Fig. 2. In this figure the modified seal is formed from the same elements described in connection with the seal of Fig. 2 and these elements are identified by the same reference numerals. However, it will be noted that casing 21 and spacer 23 contain a passageway 33 there-through which is provided for attachment to a source of high pressure fluid. This modified form of seal 20 is designed for use in an installation where, for example, the bearing lubricating fluid is under a higher pressure than the fluid on the other side of the seal. Under such conditions the lubricating fluid will flow through the radial clearances 29a and undesirable leakage will occur. To overcome this it is possible to introduce a high pressure fluid such as air into the casing 21 of the seal 20. The higher pressure of the air within the casing will bring about a controlled leakage of the air through the radial clearances 29a of both of the rings 29. As a result the air will leak outwardly of the seal at both ends thereof and the air pressure will be sufficient to prevent the reverse flow of the lubricating fluid axially along the shaft 28. At the same time the ring 29 opposite the end of the seal associated with the bearing will act to control the amount of leakage of high pressure air from the casing 21 into the remainder of the device. In utilizing a seal of this nature the high pressure fluid must be expendable and incapable of interfering with the operation of the device. The use of high pressure fluid under such conditions and in the manner described will prevent the loss of lubricating fluid from the bearing or any other sealed part. Obviously, any number of the passageways 33 may be provided in the casing 21 depending on the requirements of the particular installation.

While the rings 18 and 29 have been described as being formed from carbon it should be understood that other suitable material can be used. The material of the rings 19 and 30 is preferably that which exhibits substantially the same thermal coefficient of expansion as the material of the surface being sealed. The use of any materials which are capable of carrying out the principles of the present invention are intended to be included within the scope thereof.

The construction of the seals described is simple and inexpensive. The composite sealing unit comprising a steel banded carbon sealing ring may be readily assembly by a familiar shrink-fit operation and the other components of the seals may vary considerably in nature and in their relationship. It should be obvious that any number of sealing units, i.e. composite carbon and steel ring structures may be used in a single casing. It should be further noted that in the combining of the metal rings with the carbon rings the former are of substantial mass and radial thickness and extend axially for the greater part of the length of the carbon ring. Furthermore, as shown in the drawings, the metal rings have approximately half the thickness of the carbon rings.

While a typical use for the seal has been described in connection with the operation of jet engines it should be understood that there are many additional uses to which a seal incorporating the principles of the present invention may be put. For example, the principle of modifying the thermal expansivity characteristics of a relatively non-flexible material may be made use of in an installation which does not require the rotatable end face sealing function described above. Furthermore, this principle may be made use of in an installation where the seal is stationary and is in sealing engagement with a stationary member. Obviously the member being sealed need not be a rotatable member but may be a stationary or reciprocating member. The primary function of a seal made in accordance with the teachings of the present invention is its ability to efficiently operate under changing temperature conditions. It should be particularly noted that such a seal is also capable of efficient operation in connection with the sealing of high speed rotatable shafts. However, it is not intended that the present invention be limited solely to such a use.

Obviously many modifications and variations of the invention as hereinbefore set forth may be made without departing from the spirit and scope thereof, and therefore only such limitations should be imposed as are indicated in the appended claims.

I claim:

1. In combination, a shaft member, a shaft member seal and a shaft member housing, said seal being received in said housing about said shaft member, said seal comprising a casing having received therein a sealing ring formed from a material having a thermal coefficient of expansion which is low as compared to that of the material of said shaft member, the inner surface of said sealing ring being in spaced relation to the surface of said shaft member and having a predetermined constant gap therebetween, and a thermal expansion controlling ring received about the outer surface of said sealing ring and being of smaller inside diameter than the outside diameter of said sealing ring to hold the same in a state of compression, the material of said expansion controlling ring having a thermal coefficient of expansion which is greater than that of said sealing ring to control thermal expansion thereof to maintain said gap during operation of said shaft member under elevated temperature conditions.

2. The combination of claim 1 wherein said seal casing is formed with axially spaced radial side walls and said sealing ring is received between said side walls for movement into end face sealing engagement with one of said side walls in response to pressure transmitted axially along said shaft member.

3. In combination, a shaft member, a shaft member seal, and a shaft member housing, said seal being received in said housing about said shaft member, said seal comprising a casing of generally U-shaped inwardly opening cross section provided with axially spaced radial side walls and having received therein a pair of sealing rings formed from a material having a thermal coefficient of expansion which is low as compared to that of the material of said shaft member, the inner surface of each of said sealing rings being in spaced relation to the surface of said shaft member and having a predetermined constant gap therebetween, a thermal expansion controlling ring received about the outer surface of each of said sealing rings and being of smaller inside diameter than the outside diameter of said sealing rings to hold the same in a state of compression, the material of said expansion controlling rings having a thermal coefficient of expansion which is greater than that of said sealing rings to control thermal expansion thereof to maintain said gaps during operation of said shaft member, each of said sealing rings having an end face sealing portion in engagement with one of said side walls, and resilient means in said casing between said sealing rings and in a state of compressed engagement therewith to maintain said sealing rings in end face sealing engagement with said side walls.

4. The combination of claim 3 wherein said casing is provided with an opening in an axially extending portion thereof intermediate said sealing rings for the introduction of high pressure fluid thereinto.

References Cited in the file of this patent

UNITED STATES PATENTS

| | | |
|---|---|---|
| 2,440,947 | Hart | May 4, 1948 |
| 2,512,697 | Te Grotenhuis | June 27, 1950 |
| 2,543,615 | Trumpler | Feb. 27, 1951 |
| 2,639,171 | Johnson | May 19, 1953 |